United States Patent
Li et al.

(10) Patent No.: US 11,262,512 B2
(45) Date of Patent: Mar. 1, 2022

(54) MULTI-CHANNEL WAVELENGTH DIVISION MULTIPLEXING OPTICAL RECEIVING COMPONENT AND OPTICAL MODULE

(71) Applicant: LINKTEL TECHNOLOGIES CO., LTD., Hubei (CN)

(72) Inventors: Linke Li, Hubei (CN); Tianshu Wu, Hubei (CN); Xianwen Yang, Hubei (CN); Jian Zhang, Hubei (CN)

(73) Assignee: LINKTEL TECHNOLOGIES CO., LTD., Wuhan (CN)

( * ) Notice: Subject to any disclaimer, the term of this patent is extended or adjusted under 35 U.S.C. 154(b) by 8 days.

(21) Appl. No.: 16/753,375

(22) PCT Filed: Apr. 23, 2019

(86) PCT No.: PCT/CN2019/083929
§ 371 (c)(1),
(2) Date: Apr. 3, 2020

(87) PCT Pub. No.: WO2020/155426
PCT Pub. Date: Aug. 6, 2020

(65) Prior Publication Data
US 2021/0041645 A1 Feb. 11, 2021

(30) Foreign Application Priority Data

Jan. 29, 2019 (CN) .......................... 201910087683.1

(51) Int. Cl.
*G02B 6/42* (2006.01)
*G02B 6/293* (2006.01)
(Continued)

(52) U.S. Cl.
CPC ....... *G02B 6/4215* (2013.01); *G02B 6/29365* (2013.01); *G02B 6/32* (2013.01);
(Continued)

(58) Field of Classification Search
CPC .... G02B 6/4215; G02B 6/29365; G02B 6/32; G02B 6/4204; G02B 6/4207;
(Continued)

(56) References Cited

U.S. PATENT DOCUMENTS 10,120,149 B1 * 11/2018 Mathai ................. G02B 6/2938
10,281,653 B2    5/2019 Kawamura et al.
(Continued)

FOREIGN PATENT DOCUMENTS

CN    106019484 A    10/2016
CN    107402425 A    11/2017
CN    108535821 A    9/2018

*Primary Examiner* — Leslie C Pascal
(74) *Attorney, Agent, or Firm* — Standley Law Group LLP

(57) ABSTRACT

In the technical field of optical communication a multi-path wavelength division multiplexing light receiving component including a substrate placed at the bottom of a housing is provided. The housing and substrate form an installation chamber, and include a light emitting unit, a light de-multiplexing unit, a reflector and a light receiving unit. The light emission unit, the light de-multiplexing unit, the reflector, and the light receiving unit are located inside the installation cavity, and the light emission unit, the light de-multiplexing unit, and the reflector are fixed on the housing, and the light receiving unit is fixed on the substrate. An optical module includes the multiplex wavelength division multiplexing optical receiving component. The length of the light receiving unit is shortened by reflecting an optical signal decomposed by a light de-multiplexing unit, and disposing the light receiving unit integrally below a reflector.

7 Claims, 2 Drawing Sheets

(51) Int. Cl.
*G02B 6/32* (2006.01)
*H04B 10/50* (2013.01)
(52) U.S. Cl.
CPC ......... *G02B 6/4204* (2013.01); *G02B 6/4207* (2013.01); *G02B 6/4214* (2013.01); *H04B 10/506* (2013.01)
(58) Field of Classification Search
CPC .. G02B 6/4214; G02B 6/4206; G02B 6/4292; G02B 6/4246; H04B 10/506; H04B 10/40
See application file for complete search history.

(56) References Cited

U.S. PATENT DOCUMENTS

| | | | | |
|---|---|---|---|---|
| 2010/0209103 | A1* | 8/2010 | Sakigawa | G02B 6/4214 398/45 |
| 2014/0346323 | A1* | 11/2014 | Fujimura | G02B 6/4215 250/208.2 |
| 2015/0136957 | A1* | 5/2015 | Iemura | G01J 1/0204 250/208.2 |
| 2016/0323038 | A1* | 11/2016 | Zhou | H04B 10/503 |

* cited by examiner

MULTI-CHANNEL WAVELENGTH DIVISION MULTIPLEXING OPTICAL RECEIVING COMPONENT AND OPTICAL MODULE

FIELD OF THE TECHNOLOGY

The present invention relates to the technical field of optical communication, in particular to a multi-channel wavelength division multiplexing optical receiving component and an optical module.

BACKGROUND

Higher speed, higher integration, and smaller packaging have always been the development target of high-speed optical modules, at present, a 100G QSFP28 optical transceiver module with a small packaging size has already obtained a large amount of applications in data centers and Ethernet networks, next generation optical modules will be 200G, 400G in the coming years, and then develop towards 800G. In order to meet the requirement of high density of optical interfaces of optical switches, the packaging size of 200G, 400G and even 800G optical modules is to be kept equivalent to QSFP28, which poses a very high challenge to the packaging design of optical modules.

The optical module has four main components of a light emitting component, a light receiving component, a PCBA and a packaging housing. As the speed is increased, along with the increasing of the functions of the module, the power consumption is also increased, even the number of channels of the light emitting components and the light receiving components are doubled, the size of an IC chip on the PCBA is increased, components are increased correspondingly, therefore the great challenge is brought to the layout of the PCB. In this respect, if the packaging size of the light emitting component and the light receiving component is reduced, more PCB layout space can be reserved, and therefore, it is most practical to reduce the packaging size of the optical unit.

SUMMARY

The present invention provides a multi-channel wavelength division multiplexing optical receiving component and optical module, which effectively shorten the length of a light receiving unit by reflecting back an optical signal decomposed by a light de-multiplexing unit, and disposing the light receiving unit integrally under a reflector, and which has a similar structure and the same manufacturing process as a conventional transmissive light de-multiplexing unit without increasing the complexity of the process.

In order to achieve the above object, the embodiments of the present invention provide the following technical solutions: a multi-channel wavelength division multiplexing optical receiving component, comprises a housing and a substrate mounted at the bottom of the housing, wherein the housing and the substrate enclose to form an installation chamber, and the multi-channel wavelength division multiplexing optical receiving component further comprises:

a light emitting unit, used for emitting a first parallel light with a plurality of wavelength light signals;

a light de-multiplexing unit, used for de-multiplexing the first parallel light into multiple second parallel lights with a single wavelength, and reflecting the second parallel lights back to the light outlet of the light emitting unit;

a reflector, used for reflecting each of the second parallel lights at the light outlet of the light emitting unit; and a light receiving unit, used for receiving and processing each of the second parallel lights reflected by the reflector and disposed below the light de-multiplexing unit.

The light emission unit, the light de-multiplexing unit, the reflector and the light receiving unit are all disposed in the installation chamber, and the light emission unit, the light de-multiplexing unit and the reflector are all fixed on the housing, and the light receiving unit is fixed on the substrate.

Further, the light de-multiplexing unit comprises a polyhedral structure with a first inclined surface and a second inclined surface parallel to each other, both the first inclined surface and the second inclined surface are inclined along with the direction from the light receiving unit to the reflector, and the inclined direction is away from the light emitting unit, and the first inclined surface is close to the light outlet of the light emitting unit; the first inclined surface is provided with a light inlet for the first parallel light to enter and a plurality of optical filters which are sequentially arranged, the optical filters correspond to the second parallel light one by one, and each optical filter only transmits the second parallel light corresponding to the optical filter; the second inclined surface is provided with a first total reflection film for reflecting the first parallel light transmitted from the light inlet to the first inclined surface.

Further, an included angle between the first parallel light reflected by the first total reflection film and the first parallel light emitted by the light emission unit is greater than 0° and less than 90°.

Further, the polyhedral structure has a first parallel surface and a second parallel surface both parallel to the first parallel light, the second parallel surface close to the light receiving unit.

Further, an anti-reflection optical filter is disposed at the light inlet.

Further, the light emitting unit comprises an optical fiber adapter for emitting an optical signal with a plurality of wavelengths, and a collimating lens for collimating the optical signal transmitted from the end face of the optical fiber adapter into the first parallel light.

Further, the reflector is plated with a second total reflection film.

Further, the light receiving unit comprises a PD array for converting an optical signal to an electrical signal and a TIA array for amplifying and shaping the electrical signal output from the PD array, the PD array is disposed below the reflector, and the TIA array and the PD array are disposed on the same surface and are disposed below the light de-multiplexing unit.

Further, the light receiving unit also comprises the convergent lens array that is used for converging the multiple second parallel light, the convergent lens array is disposed below the reflector. The included angle between the array direction of convergent lens array and the optical axis of light emitting unit and the included angle between the reflector and the optical axis of light emitting unit are equal.

The embodiment of the present invention provides another technical solution that: an optical module comprises a housing, a light emitting component and a multi-channel wavelength division multiplexing optical receiving component mentioned above, wherein the light emitting component and the multi-channel wavelength division multiplexing optical receiving component are disposed on the housing.

Compared with the prior art, the present invention has the beneficial effects that: the optical signal decomposed by the light de-multiplexing unit is reflected back, and the light receiving unit is disposed integrally below the reflector, so that the length of the light receiving unit is shortened effectively, and which has a similar structure and the same manufacturing process as a conventional transmissive light de-multiplexing unit without increasing the complexity of the process.

Figure 1:
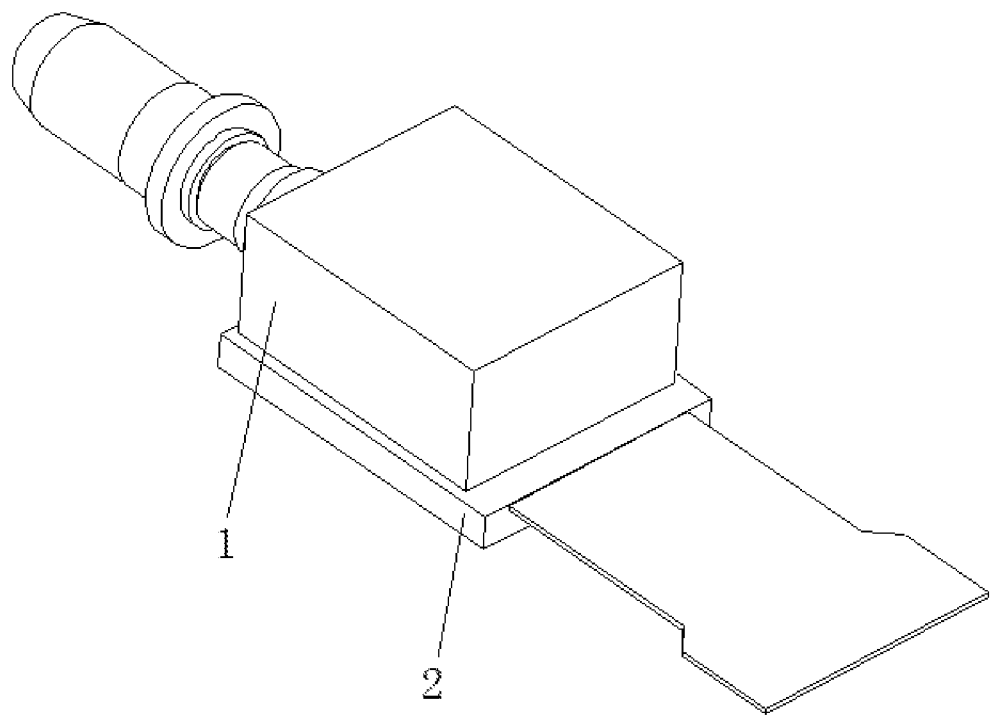
FIG. 1 is a schematic structural diagram of an external shape of a multi-channel wavelength division multiplexing optical receiving component according to an embodiment of the present invention.

In the reference character list:
1—housing; 2—substrate; 30—fiber optic adapter; 31—collimating lens; 4—light de-multiplexing unit; 40—polyhedral structure; 400—first inclined surface; 401—second inclined surface; 402—first parallel surface; 403—second parallel surface; 41—first optical filter; 42—second optical filter; 43—third optical filter; 44—fourth optical filter; 45—anti-reflection optical filter; 50—PD array; 51—TIA array; 6—convergent lens array; 7—reflector

DETAILED DESCRIPTION

The technical solutions in the embodiments of the present invention will be clearly and completely described below with reference to the drawings in the embodiments of the present invention, and it is obvious that the described embodiments are only a part of the embodiments of the present invention, and not all of the embodiments. All other embodiments, which can be obtained by a person skilled in the art without making any creative effort based on the embodiments in the present invention, belong to the protection scope of the present invention.

Embodiment 1

Referring to FIG. 1-4, the embodiment of the present invention provides a multi-channel wavelength division multiplexing optical receiving component, which includes a housing 1 and a substrate 2 mounted at the bottom of the housing 1, and the housing 1 and the substrate 2 enclose to form an installation chamber, wherein the multi-channel wavelength division multiplexing optical receiving component further includes a light emitting unit, a light de-multiplexing unit 4, a reflector 7, and a light receiving unit. The light emitting unit, the light de-multiplexing unit 4, the reflector 7 and the light receiving unit are disposed inside the installation chamber. The light emitting unit, the light de-multiplexing unit 4 and reflector 7 are all installed on the housing 1, and the light receiving unit is installed on the substrate 2. The light emitting unit is used to emit the first parallel light with a plurality of wavelength optical signals, the light de-multiplexing unit 4 is used to decompose the first parallel light into multiple second parallel light with a single wavelength, and reflect each of the second parallel light back to the light outlet of the light emitting unit. The reflector 7 is used to reflect each of the second parallel light at the light outlet of the light emitting unit, and the light receiving unit is used to receive and process each of the second parallel light reflected by the reflector 7, and is disposed below the light de-multiplexer. In the prior art, the light emitting unit, the light de-multiplexing unit 4 and the light receiving unit are all disposed in line along with the optical path, and they are all disposed on the same horizontal line, i.e. similar to the "straight-line" arrangement, wherein the light de-multiplexing unit is a conventional transmissive light de-multiplexing unit, that the first parallel light in this embodiment is decomposed into the second parallel lights by passing through the transmissive light de-multiplexing unit. However, with the increase of the speed, the size of the components in the light receiving unit will become larger, and the number of elements also increases, so that the board layout space of the PCB in the optical module will be smaller and smaller, and if the above layout is adopted, the molding of the optical module will be seriously affected. Therefore, in the present embodiment, the light de-multiplexing unit 4 is a reflective light de-multiplexing unit, and specifically, it has a function of de-multiplexing the first parallel light into multiple second parallel lights, and at the same time, it can also reflect each second parallel light back to the light outlet of the light emitting unit, and then reflect each second parallel light to the light receiving unit by the reflector 7, so that the positions of the light receiving units can be arranged according to the reflection angle of the reflector 7. For example, the light receiving unit is disposed below the light de-multiplexing unit 4, so that the space problem caused by the above-mentioned "straight-line" arrangement is overcome, and more space is reserved for PCB layout. In addition, since the light emitting unit, the light de-multiplexing unit 4, the reflector 7 and the light receiving unit are all disposed inside the installation chamber, the overall structure of the light receiving component is not affected.

Figure 2:
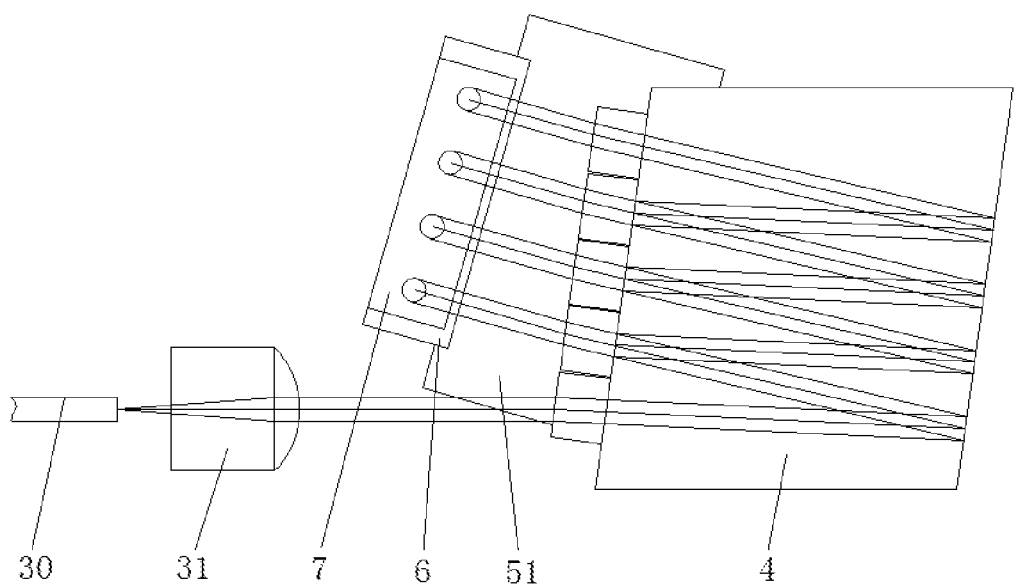
FIG. 2 is a front view of a light path of a multi-channel wavelength division multiplexing optical receiving component according to an embodiment of the present invention.
Figure 3:
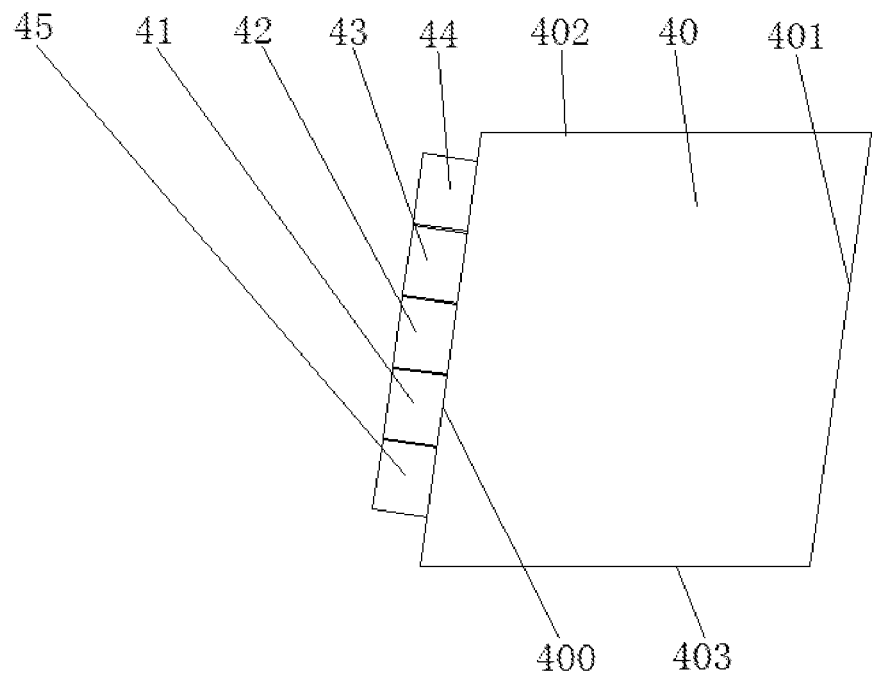
FIG. 3 is a schematic diagram of a light de-multiplexer of a multi-channel wavelength division multiplexing optical receiving component according to an embodiment of the present invention.
Figure 4:
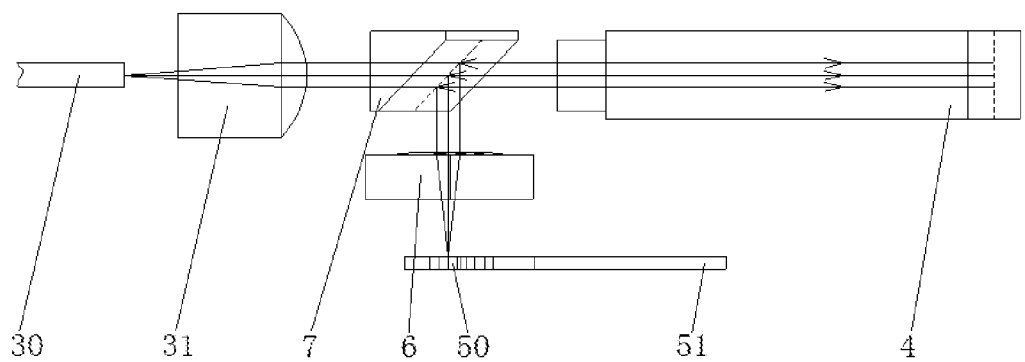
FIG. 4 is a side view of a light path of a multi-channel wavelength division multiplexing optical receiving component according to an embodiment of the present invention.

The following are specific examples:

In order to optimize the above solution, referring to FIG. 2, FIG. 3 and FIG. 4, the light de-multiplexing unit 4 includes a polyhedral structure 40 which has a first inclined surface 400 and a second inclined surface 401 which are parallel to each other. The first inclined surface 400 and the second inclined surface 401 are both inclined along with the direction from the light receiving unit to the reflector 7, and the inclined direction is away from the light emitting unit, and the first inclined surface 400 is close to the light outlet of the light emitting unit. The first inclined surface 400 has a light inlet for the first parallel light to enter and a plurality of optical filters arranged sequentially. The plurality of optical filters correspond to the plurality of second parallel lights one by one, and each optical filter only transmits the second parallel light corresponding to the optical filter. The second inclined surface 401 has a first total reflection film for reflecting the first parallel light transmitted from the light inlet to the first inclined surface 400. In this embodiment, a polyhedral structure 40 is used to decompose an optical signal, the first inclined surface 400 and the second inclined surface 401 of the polyhedral structure 40 are parallel to each other but play different roles. First, the first parallel light is transmitted into the polyhedral structure 40 from the first inclined surface 400 to the second inclined surface 401, and since the second inclined surface 401 has a first total reflection film and a certain inclination angle, the first parallel light can be reflected back to the first inclined surface 400 and then transmitted by a plurality of optical filters, thereby realizing decomposition. For convenience of detailed description, optical signals of a plurality of wavelengths fused by the first parallel light are respectively defined as $\lambda_1$, $\lambda_2$, $\lambda_3$, $\lambda_4$, and the plurality of filters are respectively defined as a first filter 41, a second filter 42, a third filter 43, and a fourth filter 44, and the first filter 41 has a narrow-band transmissive film matching the $\lambda_1$ passband, the second filter 42 has a narrow-band transmissive film matching the $\lambda_2$ passband, the third filter 43 has a narrow-band transmissive film matching the $\lambda_3$ passband, and the fourth filter 44 has a narrow-band transmissive film matching the $\lambda_4$ passband. First, the first parallel light is transmitted from the light inlet of the first inclined surface 400 to the second inclined surface 401, and the second inclined surface 401 reflects the first parallel light to the first inclined surface 400. In this case, the optical signal with the wavelength $\lambda_1$ can be transmitted through the first optical filter 41, while other optical signals with different wavelengths are reflected back to the second inclined surface 401. Then, the optical signals mixed with $\lambda_2$, $\lambda_3$, $\lambda_4$ are reflected by the second inclined surface 401 to the first inclined surface 400 again, at this time, the optical signal with the wavelength of $\lambda_2$ can be transmitted through the second filter 42, and other optical signals with different wavelengths are reflected back to the second inclined surface 401. Then, the optical signal mixed with $\lambda_3$ and $\lambda_4$ is reflected by the second inclined surface 401 to the first inclined surface 400 for the third time, in which the optical signal with the wavelength of $\lambda_3$ can be transmitted through the third filter 43, and the optical signal with the wavelength of $\lambda_4$ is reflected back to the second inclined surface 401. Then the optical signal is reflected to the first inclined surface 400 by the second surface plane 401 for the fourth time and is transmitted through the fourth optical filter 44, thereby completing the process of decomposing the first parallel light into the multi-channel second parallel light. Moreover, because the optical signal is reflected back, the layout of the light emitting unit can be flexible and changeable, and is not limited by the conventional 'straight-line' layout, especially by coordinating with the reflector 7, the light receiving unit can be disposed at the lower position of the light de-multiplexing unit 4, so that the occupied space is greatly reduced, preferably, the reflector 7 is plated with a second total reflection film.

The above solution is further optimized, as shown in FIG. 3, the angle between the first parallel light reflected by the first total reflection film and the first parallel light emitted by the light emitting unit is greater than 0° and less than 90°. In this embodiment, the included angle between the first parallel light in the direction of the light path after the first reflection and the direction of the light path when the initial first parallel light is emitted is between 0° and 90°. Preferably, the length of the light receiving unit can be shortened most effectively as the included angle approaches 0°, i.e., the return angle approaches 180°. Therefore, it is preferable that the inclination angles of the first inclined surface 400 and the second inclined surface 401 are adjustable to facilitate the adjustment in later stage.

As an optimization solution of the embodiment of the present invention, in FIGS. 2, 3 and 4, the polyhedral structure 40 further has a first parallel surface 402 and a second parallel surface 403 which are both parallel to the first parallel light, and the second parallel surface 403 is close to the light receiving unit. In this embodiment, the first parallel surface 402 and the second parallel surface 403, i.e., the upper and lower surfaces of the polyhedral structure 40, which are both parallel to the first parallel light, can facilitate the installation of the polyhedral structure 40 in the housing 1. Preferably, the polyhedral structure 40 can be a hexahedral structure, an octahedral structure, or even a more polyhedral structure, but it is only necessary to ensure that the first inclined surface 400 and the second 401 are parallel to each other, and the first parallel surface 402 and the second 403 are parallel to the first parallel light. The embodiment does not set any limit to this, and other structures also fall into the protection scope of the present application.

As an optimized solution of the embodiment of the present invention, please refer to FIG. 3, an anti-reflection filter 45 is disposed at the light inlet. In this embodiment, the anti-reflection filter 45 is disposed at the light inlet of the first inclined surface 400 for transmitting the optical signals of all wavelengths.

As an optimization solution of the embodiment of the present invention, please refer to FIG. 2 and FIG. 4, the light emitting unit includes a fiber optic adapter 30 for transmitting optical signals with a plurality of wavelengths, and a collimating lens 31 for collimating the optical signals transmitted by the end face of the fiber optic adapter 30 into the first parallel light. In the present embodiment, the light emitting unit is composed of the fiber optic adapter 30 and the collimating lens 31, the fiber optic adapter 30 is intended to emit light signals having a plurality of wavelengths, and the collimating lens 31 is intended to collimate these light signals into parallel light.

As an optimized solution of the embodiment of the present invention, please refer to FIG. 2 and FIG. 4, the light receiving unit includes a PD array 50 for converting an optical signal into an electrical signal and a TIA array 51 for amplifying and shaping the electrical signal output from the PD array 50. The PD array 50 is disposed below the reflector 7, and the TIA array 51 and the PD array 50 are disposed on the same surface and below the light de-multiplexing unit 4. In the present embodiment, the light receiving unit is composed of a PD (light receiving) array and a TIA array 51, which are sequentially disposed at the rearmost end of the above-described "straight-line" arrangement in the conventional light receiving module. After the light is reflected back, the PD array 50 may be disposed below the reflector 7, and a TIA (Transimpedance Amplifier) array may be disposed below the light de-multiplexing unit 4, so that the vertical space in the installation chamber may be utilized to reserve more space for PCB layout.

As an optimized solution of the embodiment of the present invention, please refer to FIG. 2 and FIG. 4, the light receiving unit further includes a convergent lens array 6 for converging the plurality of paths of the second parallel light, the convergent lens array 6 is disposed below the reflector 7, and the included angle between the array direction of the converging lens array 6 and the optical axis (a direction in which light is emitted) of the light emitting unit is equal to the included angle between the reflector 7 and the optical axis (a direction in which light is emitted) of the light emitting unit. In this embodiment, the converging lens array 6 is used to converge multiple optical signals into multiple small optical spots for the PD array 50.

As an optimized solution of the embodiment of the present invention, the light receiving unit is adhered to the substrate 2; the substrate 2 comprises a PCB, a soft and hard combination board with an FPC board or a metal board adhered with the FPC board. In the present embodiment, there are many kinds of substrate 2, and the present embodiment is not limited thereto.

Embodiment 2

The embodiment of the invention provides an optical module which comprises a housing, a light emitting component and a multi-channel wavelength division multiplexing optical receiving component, wherein the light emitting component and the multi-channel wavelength division multiplexing optical receiving component are disposed on the housing. In the present embodiment, the above-mentioned multi-channel wavelength division multiplexing optical receiving component is adopted, and the optical signal decomposed by the light de-multiplexing unit is reflected back, and the light receiving unit is integrally disposed below the reflector, so as to effectively shorten the length of the light receiving unit, and thus the existing size of the housing is not changed, and the reflective light de-multiplexing unit has a structure similar to that of the conventional transmissive light de-multiplexing unit and has the same manufacturing process, and the process complexity is not increased.

Although embodiments of the present invention have been shown and described, it will be appreciated by those skilled in the art that various changes, modifications, substitutions and alterations can be made in these embodiments without departing from the principles and spirit of the present invention, the scope of which is defined in the appended claims and their equivalents.

The invention claimed is:

1. A multi-channel wavelength division multiplexing optical receiving component comprising:
  a housing;
  a substrate mounted at the bottom of the housing, wherein the housing and the substrate enclose to form an installation chamber; and
  a light emitting unit, a light de-multiplexing unit, a reflector, and a light receiving unit, which are all disposed in the installation chamber;
  wherein the light emitting unit, the reflector, and the light de-multiplexing unit are arranged in sequence along a straight line, and the light receiving unit is disposed below the reflector;
  wherein the light emitting unit is configured to emit a first parallel light with a plurality of wavelength light signals, and the first parallel light is transmitted through the reflector to the light de-multiplexing unit;
  wherein the light de-multiplexing unit is configured to de-multiplex the first parallel light into multiple second parallel lights with a single wavelength, and reflect the second parallel lights backward to the reflector;
  wherein the reflector is configured to reflect each of the second parallel lights downward to the light receiving unit;
  wherein the light receiving unit is configured to receive and process each of the second parallel lights;
  wherein the light de-multiplexing unit comprises a polyhedral structure with a first inclined surface and a second inclined surface parallel to each other, both the first inclined surface and the second inclined surface are inclined along a direction from the light receiving unit to the reflector, and the inclined direction is away from the light emitting unit, and the first inclined surface is close to a light outlet of the light emitting unit;
  wherein the first inclined surface is provided with a light inlet for the first parallel light to enter and a plurality of optical filters which are sequentially arranged, the optical filters correspond to the second parallel light one to one, and each optical filter only transmits the second parallel light corresponding to the optical filter out of the polyhedral structure;
  wherein the second inclined surface is provided with a first total reflection film for reflecting the first parallel light transmitted from the light inlet to the first inclined surface; and
  wherein the polyhedral structure has a first parallel surface and a second parallel surface both parallel to the first parallel light, and the second parallel surface is close to the light receiving unit.

2. The component of claim 1, wherein an included angle between the first parallel light reflected by the first total reflection film and the first parallel light emitted by the light emitting unit is greater than 0° and less than 90°.

3. The component of claim 1, wherein an anti-reflection optical filter is disposed at the light inlet.

4. The component of claim 1, wherein the light emitting unit comprises an optical fiber adapter for emitting an optical signal with a plurality of wavelengths, and a collimating lens for collimating the optical signal transmitted from the end face of the optical fiber adapter into the first parallel light.

5. The component of claim 1, wherein the reflector is plated with a second total reflection film.

6. The component of claim 1, wherein the light receiving unit comprises a PD array for converting an optical signal to an electrical signal and a TIA array for amplifying and shaping the electrical signal output from the PD array, wherein the PD array is disposed below the reflector, and the TIA array and the PD array are disposed on the same surface.

7. The component of claim 1, further comprising a convergent lens array that is configured to converge the multiple second parallel light, wherein the convergent lens array is disposed below the reflector, and the included angle between the array direction of the convergent lens array and the optical axis of light emitting unit and the included angle between the reflector and the optical axis of light emitting unit are equal.

* * * * *